(12) United States Patent
Choi

(10) Patent No.: US 7,410,189 B2
(45) Date of Patent: Aug. 12, 2008

(54) MOUNTING STRUCTURE OF CURTAIN AIRBAG IN VEHICLE

(75) Inventor: Hyeong-Ho Choi, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 11/299,383

(22) Filed: Dec. 8, 2005

(65) Prior Publication Data
US 2007/0132216 A1 Jun. 14, 2007

(51) Int. Cl.
*B60R 21/203* (2006.01)
(52) U.S. Cl. .................. 280/730.2; 296/214
(58) Field of Classification Search ........... 280/728.2, 280/728.3, 730.2, 730.1; 296/39.1, 214
See application file for complete search history.

(56) References Cited

U.S. PATENT DOCUMENTS

| 6,254,123 | B1* | 7/2001 | Urushi et al. | 280/730.2 |
| 6,672,027 | B2* | 1/2004 | Mizutani et al. | 52/716.5 |
| 7,134,682 | B2* | 11/2006 | Totsuka et al. | 280/728.2 |
| 2001/0052210 | A1* | 12/2001 | Mizutani et al. | 52/208 |
| 2003/0205889 | A1* | 11/2003 | Ikeda et al. | 280/730.2 |
| 2006/0220356 | A1* | 10/2006 | Baekelandt | 280/730.2 |
| 2006/0290113 | A1* | 12/2006 | Bernat et al. | 280/730.1 |
| 2007/0126215 | A1* | 6/2007 | Choi | 280/730.2 |
| 2007/0132217 | A1* | 6/2007 | Seong | 280/730.2 |

FOREIGN PATENT DOCUMENTS

JP  2003-011766  1/2003

* cited by examiner

*Primary Examiner*—Christopher Ellis
*Assistant Examiner*—Joseph Rocca
(74) *Attorney, Agent, or Firm*—Morgan Lewis & Bockius LLP

(57) ABSTRACT

A mounting structure of a curtain airbag in a vehicle is disclosed. The structure is adapted to easily form an inflation passage between a pillar trim and pillar by using a head liner; therefore, the overall portions of the curtain airbag can smoothly expand during the deployment. Such mounting structure may be performed with the head liner, pillar trim, and force transmission means.

2 Claims, 3 Drawing Sheets

MOUNTING STRUCTURE OF CURTAIN AIRBAG IN VEHICLE

FIELD OF THE INVENTION

The present invention relates to a structure of mounting a curtain airbag in a vehicle and, more particularly, to a structure of a pillar trim and head liner enclosing the curtain airbag.

BACKGROUND OF THE INVENTION

A curtain airbag is generally arranged in a space formed by a roof side rail and head liner and extends to a space formed by an A-pillar and pillar trim. When the curtain airbag inflates, the head liner and pillar trim each separate from the roof side rail and A-pillar to create an inflation passage into the passenger compartment.

The head liner and pillar trim should easily be separated from the roof side rail and A-pillar for a smooth deployment of the curtain airbag, however, should not completely be separated from the vehicle body for preventing injury to the passengers.

In the normal state, the head liner and pillar trim should properly be supported by the vehicle body and stably shroud the curtain airbag.

The region where the curtain airbag is wrapped by the head liner and roof side rail can relatively and easily make the inflation passage when the curtain airbag expands. However, the region where the curtain airbag is wrapped by the A-pillar and pillar trim contains an edge of the curtain airbag and makes it difficult in configuration to supply a sufficient expansion force of the curtain airbag. Therefore, the inflation passage can insufficiently be formed between the A-pillar and pillar trim.

SUMMARY OF THE INVENTION

Embodiments of the present invention help easily form an inflation passage between a pillar trim and A-pillar during the deployment of a curtain airbag, thereby enabling all portions of the curtain airbag to smoothly deploy.

A mounting structure of a curtain airbag for a vehicle according to an embodiment of the present invention includes a head liner that forms a space with a roof side rail for storing a curtain airbag. A pillar trim is located adjacent to the head liner and forms a space with a pillar for storing the curtain airbag. A force transmission means is in close proximity to the head liner and pillar trim and extends from the interior of the head liner to the interior of the pillar trim for transmitting the force of the head liner (tending to move down into the passenger compartment during the deployment of the curtain airbag) to the pillar trim.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
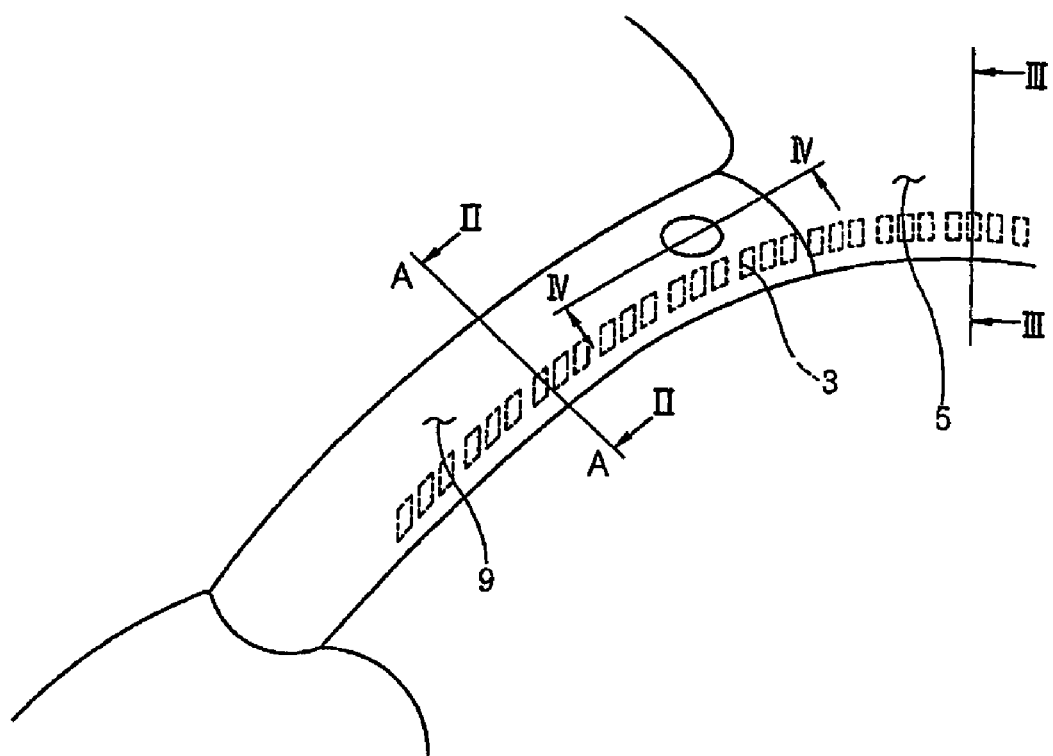
FIG. 1 illustrates a mounting structure of a curtain airbag for a vehicle according to an embodiment of the present invention.
Figure 2:
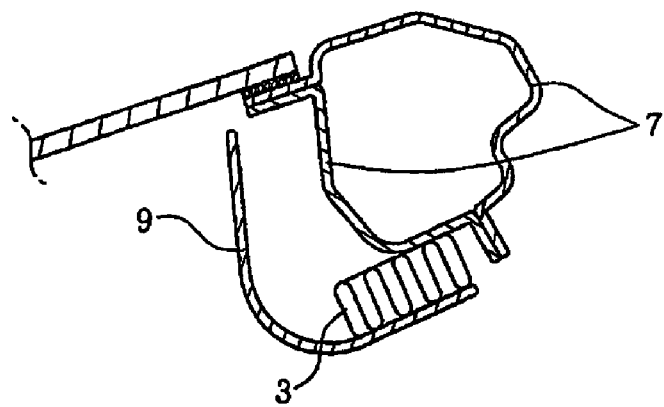
FIG. 2 is a cross-sectional view taken along line II-II of FIG. 1.
Figure 3:
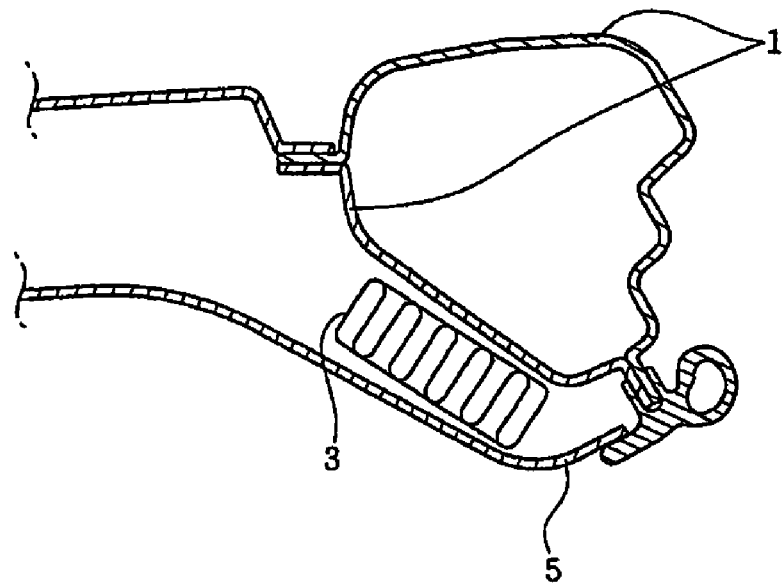
FIG. 3 is a cross-sectional view taken along line III-III of FIG. 1.
Figure 4:
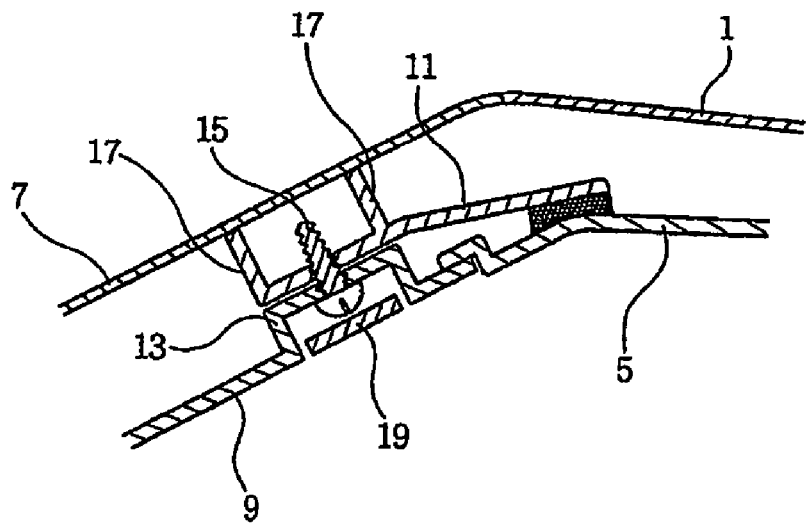
FIG. 4 is a cross-sectional view taken along line IV-IV of FIG. 1 according to a first embodiment of the present invention.
Figure 5:
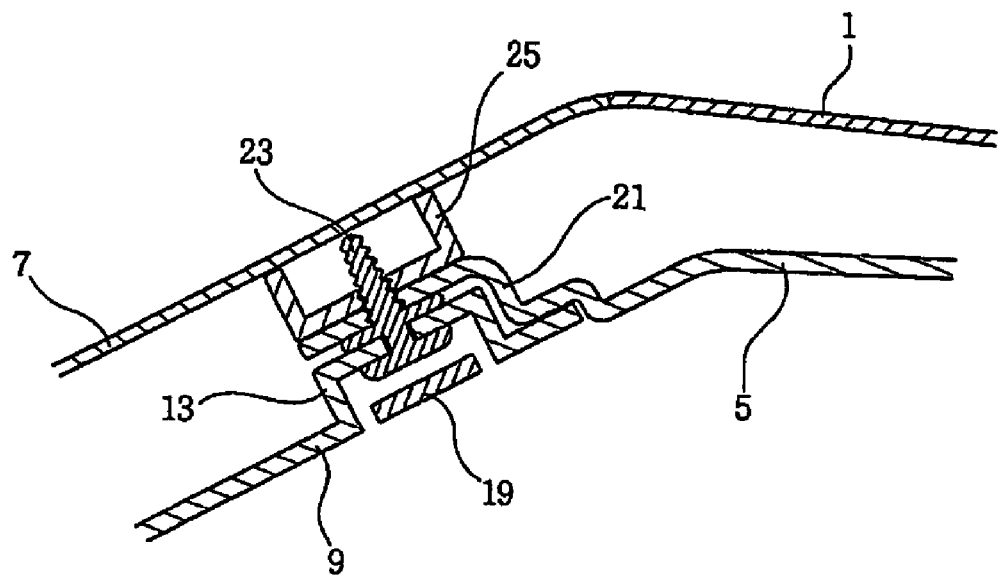
FIG. 5 is a cross-sectional view of a second embodiment of the present invention corresponding to FIG. 4.
Figure 6:
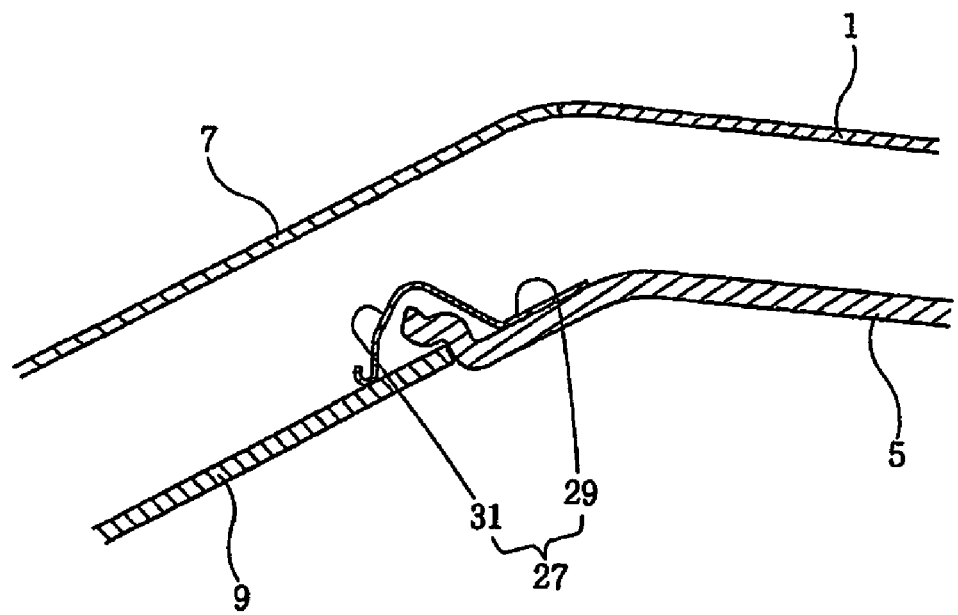
FIG. 6 is a cross-sectional view of a third embodiment of the present invention corresponding to FIG. 4.

Referring to FIGS. 4 to 6, embodiments of the present invention include a head liner 5 that forms a space with a roof side rail 1 for storing a curtain airbag 3 (see FIGS. 1 through 3). A pillar trim 9 located adjacent to head liner 5 forms a space with a pillar 7 for storing curtain airbag 3. A force transmission means is in close proximity to head liner 5 and pillar trim 9 and extends from the interior of head liner 5 to the interior of pillar trim 9. The force transmission means transmits the force of head liner 5, which tends to move down into the passenger compartment when curtain airbag 3 inflates, to pillar trim 9.

The interiors of head liner 5 and pillar trim 9 refer to the area where curtain airbag 3 is situated, and the exteriors of the above elements refer to the passenger compartment.

As illustrated in FIG. 4, the force transmission means according to a first embodiment of the present invention includes an extension plate 11 that contacts at one end thereof with the inner surface of head liner 5 while the other end extends to the interior of pillar trim 9. A coupling means couples pillar trim 9 to extension plate 11.

The coupling means is constituted by a boss 13 inwardly protruding at pillar trim 9. A coupling screw 15 penetrates from boss 13 to extension plate 11. A supporter 17 is integrally formed with extension plate 11 for maintaining the end of coupling screw 15 at a distance from pillar 7 and for locating pillar trim 9 apart from pillar 7. A cover 19 conceals boss 13.

Accordingly, coupling screw 15 that couples pillar trim 9 to extension plate 11 is invisible in the passenger compartment via cover 19.

Under such construction, if curtain airbag 3 pushes head liner 5 during the deployment, and the thrust force of curtain airbag 3 is transmitted to pillar trim 9 through extension plate 11. Thus, even if the expansion force is slightly provided to the curtain airbag between pillar trim 9 and pillar 7, a sufficient inflation passage can be created between pillar trim 9 and pillar 7.

As a result, curtain airbag 3 can smoothly expand overall. Further, even after the expansion of curtain airbag 3, pillar trim 9 is connected to head liner 5 via extension plate 11 so that a complete separation of pillar trim 9 from pillar 7 is restrained and the passengers are protected from injuries which can arise hereby.

Referring now to FIG. 5, the force transmission means according to a second embodiment of the present invention is composed of a liner extension 21 and coupling means. Liner extension 21 integrally extends from one end (adjacent to pillar trim 9) of head liner 5 to the interior of pillar trim 9, and the coupling means couples pillar trim 9 to liner extension 21.

In comparison with the first embodiment, liner extension 21 is integrally formed with head liner 5 for transmitting the force of head liner 5 to pillar trim 9 without the aid of a separate extension plate.

The coupling means includes boss 13 protruding inward at pillar trim 9. A fastener 23 is rotatably installed in relation to boss 13 and screws to liner extension 21. A supporter 25 is fixed to liner extension 21 for maintaining the end of fastener 23 at a distance from pillar 7 and for placing pillar trim 9 apart from pillar 7. Cover 19 conceals boss 13.

Supporter 25 contacts or welds in advance with liner extension 21, whereby when fastener 23 screws to liner extension 21, supporter 25 is also coupled thereto by means of the screw.

In this embodiment, liner extension 21 transmits the force of curtain airbag 3 (pushing head liner 5 downward during the expansion of curtain airbag 3) to pillar trim 9.

As illustrated in FIG. 6, the force transmission means according to a third embodiment of the present invention includes an elastic plate 27 that is fixed at one surface thereof to an inner side of head liner 5 while the other surface closely attaches to an inner side of pillar trim 9.

Elastic plate 27 is composed of a flat planar portion 29 fixed in head liner 5, and an arc sectional portion 31 extending from flat planar portion 29 and closely attaches to the interior of pillar trim 9 by bypassing the contiguous region of head liner 5 and pillar trim 9.

Arc sectional portion 31 of elastic plate 27 transmits the force of head liner 5 to pillar trim 9 in the course of the deployment of curtain airbag 3.

In the third embodiment, once a space is formed between pillar trim 9 and pillar 7 for the inflation of the curtain airbag, a separate tether or the like is preferably added for preventing a complete detachment of pillar trim 9 from pillar 7.

As apparent from the foregoing, there is an advantage in that an inflation passage can easily be formed between a pillar trim and pillar by using the head liner such that the overall portions of the curtain airbag can smoothly expand during the deployment.

Furthermore, a complete separation of the pillar trim from the vehicle body is avoided during the deployment of the curtain airbag, thus effectively preventing injury to the passengers.

What is claimed is:

1. A structure for storing a curtain airbag for a vehicle, comprising:
   a head liner that forms a space with a roof side rail for storing the curtain airbag;
   a pillar trim located adjacent to said head liner and forming a space with a pillar for storing said curtain airbag; and
   force transmission means that is in close proximity to said head liner and pillar trim and extends from an interior of said head liner to an interior of said pillar trim for transmitting a force of said head liner, which tends to move down into a passenger compartment when said curtain airbag inflates, to said pillar trim, wherein said force transmission means comprises:
   an extension plate that contacts at one end thereof with an inner surface of said head liner while the other end extends to an interior of said pillar trim; and
   a fastener that couples said pillar trim to said extension plate; and a supporter integrally formed with said extension plate for maintaining an end of said fastener at a distance from said pillar and for locating said pillar trim apart from said pillar.

2. The structure as defined in claim 1, wherein said fastener further comprises:
   a boss protruding inward at said pillar trim;
   a coupling screw penetrating from said boss to said extension plate;
   wherein said supporter maintains an end of said coupling screw at a distance from said pillar; and
   a cover concealing said boss.

\* \* \* \* \*